US012736453B2

(12) United States Patent
Baek et al.

(10) Patent No.: US 12,736,453 B2
(45) Date of Patent: Sep. 15, 2026

(54) METHOD AND APPARATUS FOR ESTIMATING NANOPARTICLES IN A SOLUTION

(71) Applicant: DONGWOO FINE-CHEM CO., LTD., Jeollabuk-do (KR)

(72) Inventors: Sung Ho Baek, Jeollabuk-do (KR); Gi Hwan Ahn, Jeollabuk-do (KR); Min Ju Lee, Jeollabuk-do (KR); Tae Yong Kim, Jeollabuk-do (KR); Soo Yeong Lim, Jeollabuk-do (KR); Su Young Choi, Jeollabuk-do (KR); Min Gi Hwang, Jeollabuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 176 days.

(21) Appl. No.: 18/632,436

(22) Filed: Apr. 11, 2024

(65) Prior Publication Data

US 2024/0344952 A1 Oct. 17, 2024

(30) Foreign Application Priority Data

Apr. 14, 2023 (KR) ........................ 10-2023-0049319

(51) Int. Cl.
*G01N 15/0205* (2024.01)
*G01N 15/00* (2024.01)

(52) U.S. Cl.
CPC . *G01N 15/0205* (2013.01); *G01N 2015/0038* (2013.01)

(58) Field of Classification Search
CPC ..................... G01N 15/0205; G01N 2015/003
See application file for complete search history.

(56) References Cited

U.S. PATENT DOCUMENTS 7,679,743 B1 * 3/2010 Jung .................. G01N 15/0205 356/336
11,835,464 B1 * 12/2023 Bol'shakov ............. G01J 3/443
2013/0153790 A1 * 6/2013 Clough .............. G01N 21/3504 250/473.1
2023/0238078 A1 * 7/2023 Gonzalez Lozano ........................ G06T 7/0012 382/128

FOREIGN PATENT DOCUMENTS

KR 10-2010-00040457 A 4/2010
KR 10-2255346 B1 5/2021
KR 102324097 * 11/2021
KR 102324097 B1 * 11/2021 ......... G01N 15/0205

* cited by examiner

*Primary Examiner* — Michelle M Iacoletti
*Assistant Examiner* — Jarreas Underwood
(74) *Attorney, Agent, or Firm* — The PL Law Group, PLLC

(57) ABSTRACT

In a method for estimating nanoparticles in a solution, a laser-induced plasma is generated by making a pulsed laser beam incident on inside a cell containing a solution, feedback signals is acquired based on light, shock wave and sound generated by the laser-induced plasma, the feedback signals, an intensity of the laser incident on the cell, and intensities of each laser passing through the cell for each laser pulse are acquired, the feedback signals acquired for each laser pulse, the intensity of the laser, and the intensities of the lasers passing through the cell into a pre-trained nanoparticle estimation model is input to estimate sizes or types of unknown nanoparticles included in the solution.

10 Claims, 5 Drawing Sheets

Solution including unknown nanoparticles

Laser-induced plasma

Acquire feedback signals,
laser intensities (incident/projection)

Estimate sizes or types of
nanoparticles based on trained learning model

METHOD AND APPARATUS FOR ESTIMATING NANOPARTICLES IN A SOLUTION

CROSS-REFERENCE TO RELATED APPLICATION AND CLAIM OF PRIORITY

This application claims the benefit under 35 USC § 119 of Korean Patent Application No. 10-2023-0049319 filed on Apr. 14, 2023, in the Korean Intellectual Property Office, the entire disclosure of which is incorporated herein by reference for all purposes.

BACKGROUND

1. Field of the Invention

The present invention relates to a method and an apparatus for estimating sizes or types of nanoparticles in a solution using a trained artificial intelligence model.

2. Description of the Related Art

Various organic and inorganic chemicals used in the manufacturing process of products which require high precision, such as a display, semiconductor, and the like need higher purity chemicals than the current level in order to prevent a decrease in the manufacturing yield. To confirm the quality of the high purity chemicals, high-level analysis technologies are newly being developed and applied.

Among them, the importance of analysis on particles is increasing, and even small particles in a level of 10 nanometers or less may affect yield reduction and high integration in the semiconductor manufacturing process. Thus, the development of analysis method for controlling quality is required, and the scalability of technology should be secured to enable interpretation of the causes of defects that may occur in the manufacturing process.

In general, a state where a substance is evenly dispersed in a liquid in the form of molecules or ions is referred to as a solution, and a state where fine particles which are larger than ordinary molecules or ions and have a diameter of about 1 nm to 1000 nm are dispersed in such the solution without aggregation or precipitation is referred to as a colloidal state. Substances in such the colloidal state are called colloids.

Research on microcolloids existing in the solution is focused on obtaining information about physical and chemical properties of the substance to be analyzed or improving the detectability of a separation analyzer.

Until recently, the analysis of colloidal particles has a limit of 100 nm in size, and the development of technology is required in an aspect that high-concentration samples are required for accurate analysis of colloidal particles with a size of less than 100 nm.

As a method for measuring colloidal nanoparticles, light scattering analysis for determining the size of the particles using light scattering intensity, is generally used. However, when measuring fine nanoparticles with a size of smaller than 100 nm, if the concentration is low even when scattered light is generated, the probability of detection the fine nanoparticles is drastically reduced, making it difficult to obtain reliable results, and there is a limit where the concentration of the particles should be several ppm (parts per million) or more. The larger the particle size, the greater the scattering intensity, whereas the smaller the particle size, the smaller an area where light can be scattered, such that the intensity of the scattered light is weak, and thereby making it difficult to measure the size of the particles. For this reason, a relatively large number of particles should be able to contribute to scattering, thus sensitivity may be significantly decreased at a concentration of less than a few ppm.

Korean Patent Publication No. 10-2010-00040457 discloses, as a technology for measuring sizes of nanoparticles using a frequency distribution curve of the sizes of probe beam deflection signals generated by laser-induced rupture, a method for analyzing the sizes of nanoparticles using a change in signal intensity of the probe beam, which occurs when a shock wave generated by the laser-induced rupture of nanoparticles changes the refractive index of the solution. However, in the case of a solution including nanoparticles with various sizes, multiple frequency distribution curve fitting methods are required, and a large amount of deflection signals are required to obtain the frequency distribution curve of the signal intensity related to the probe beam deflection signal for an unknown solution.

In addition, Korean Patent Registration No. 10-2255346 discloses, as a technology related to a sample analysis method and an analysis apparatus through artificial neural network learning, a method for analyzing the sample through artificial neural network learning of emission images due to light source irradiation. However, since this technology is an analysis method for solid samples, it cannot be applied to the analysis of nanoparticles in a solution.

SUMMARY

In consideration of the above-described problems, it is an object of the present invention to provide a method and an apparatus for estimating sizes or types of nanoparticles in a solution using a trained artificial intelligence model.

However, the problems to be solved by the present invention are not limited to those described above, and other problems to be solved that are not mentioned above may be clearly understood by persons having common knowledge in the technical field to which the present invention pertains from the following descriptions.

To achieve the above object, according to an aspect of the present invention, there is provided a method for estimating nanoparticles in a solution, which includes: generating a laser-induced plasma by making a pulsed laser beam incident on inside a cell containing a solution; acquiring feedback signals based on light, shock wave and sound generated by the laser-induced plasma; acquiring the feedback signals, an intensity of the laser incident on the cell, and intensities of each laser passing through the cell for each laser pulse; and inputting the feedback signals acquired for each laser pulse, the intensity of the laser, and the intensities of the lasers passing through the cell into a pre-trained nanoparticle estimation model to estimate sizes or types of unknown nanoparticles included in the solution.

According to another aspect of the present invention, there is provided an apparatus for estimating nanoparticles in a solution, which includes: a memory configured to store information on a nanoparticle estimation model including a pre-trained machine learning model; a communication unit configured to transmit and receive information with an external device; and a processor configured to control the memory and the communication unit, wherein the processor performs the operations of: generating a laser-induced plasma by making a pulsed laser beam incident on inside a cell containing a solution; acquiring feedback signals based on light, shock wave and sound generated by the laser-induced plasma; acquiring the feedback signals, an intensity of the laser incident on the cell, and intensities of each laser passing through the cell for each laser pulse; and inputting the feedback signals acquired for each laser pulse, the intensity of the laser, and the intensities of the lasers passing through the cell into a pre-trained nanoparticle estimation model to estimate sizes or types of unknown nanoparticles included in the solution.

According to an embodiment of the present invention, signals generated by laser-induced rupture of individual nanoparticles are classified by the sizes or types of nanoparticles through machine learning, such that the sizes or types of individual nanoparticles exist in various sizes and types at low concentrations in the solution may be quickly estimated through the trained learning model.

In addition, according to an embodiment of the present invention, the conventional method for analyzing the size of particles using scattering after irradiating with light can only analyze particles larger than several tens of nanometers in size, whereas according to the laser-induced plasma detection method for the present invention, it is possible to analyze particles with a size of several to hundreds of nanometers.

Further, according to an embodiment of the present invention, only nanoparticles should be targeted, but in some cases, the solution is excited together with the solid by the laser beam. To cope with these cases, noise signals due to excitation of the solution may be filtered through the artificial intelligence model, thereby increasing the reliability of estimating the nanoparticles in the solution.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The above and other aspects, features, and advantages of the present invention will become apparent from the detailed description of the embodiments to be described in detail below in conjunction with the accompanying drawing. In this regard, it should be understood that the present invention is not limited to the following embodiments and may be embodied in various different ways, and that the embodiments are given to provide complete invention of the present invention and to provide a thorough understanding of the present invention to a person who has a common knowledge in the technical field to which the present invention belongs. The present invention is defined only by the scope of the claims.

In description of preferred embodiments of the present invention, the publicly known functions and configurations that are judged to be able to make the purport of the present invention unnecessarily obscure will not be described in detail. Further, wordings to be described below are defined in consideration of the functions of the present invention, and may differ depending on the intentions of a user or an operator or custom. Accordingly, such wordings should be defined on the basis of the contents of the overall specification.

In the present invention, it is intended to analyze the number of fine particles contained in ultra-high purity and high quality chemicals using the laser-induced plasma detection method, and to apply results thereof to an analysis for quality control.

Figure 1A:
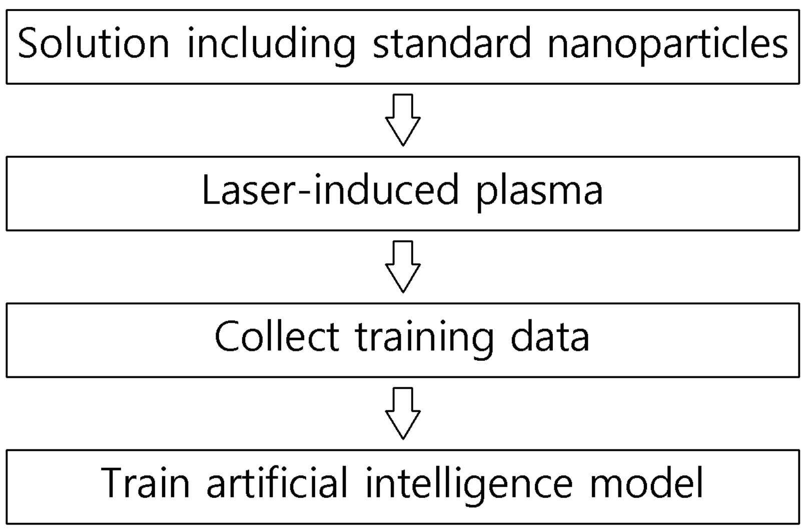
FIGS. 1A and 1B are an exemplary view of a method for estimating nanoparticles in a solution according to an embodiment of the present invention.
Figure 1B:

FIGS. 1A and 1B are an exemplary view of a method for estimating nanoparticles in a solution according to an embodiment of the present invention.

Referring to FIGS. 1A and 1B, a method (FIG. 1A) for training a nanoparticle estimation model by an apparatus for estimating nanoparticles in a solution according to an embodiment of the present invention and a method (FIG. 1B) for estimating nanoparticles based on the trained artificial intelligence model are depicted.

The method (FIG. 1A) for training a nanoparticle estimation model may be a method including: generating a laser-induced plasma by making a pulsed laser beam incident on a cell containing a solution including standard nanoparticles with previously known size or type; and training a model for estimating nanoparticles in a solution using feedback signals emitted by the same.

In particular, the method for training a nanoparticle estimation model may include a process of filtering noise feedback signals during generating training data. That is, ideally, only nanoparticles excited by a laser beam with a relatively low intensity compared to the solution should be targeted, but in some cases, the solution is excited by the laser beam. To cope with these cases, noise signals generated by the excitation of the solution may be filtered.

The method (FIG. 1B) for estimating unknown nanoparticles in a solution may further include a process of removing noise in addition to estimating the sizes or types of the nanoparticles by the trained nanoparticle measurement model in a solution. For example, if the type of solution is known, the feedback signal corresponding to the excitation reaction by each laser pulse unique to the solution may be detected as noise signals and removed in advance.

Figure 2:
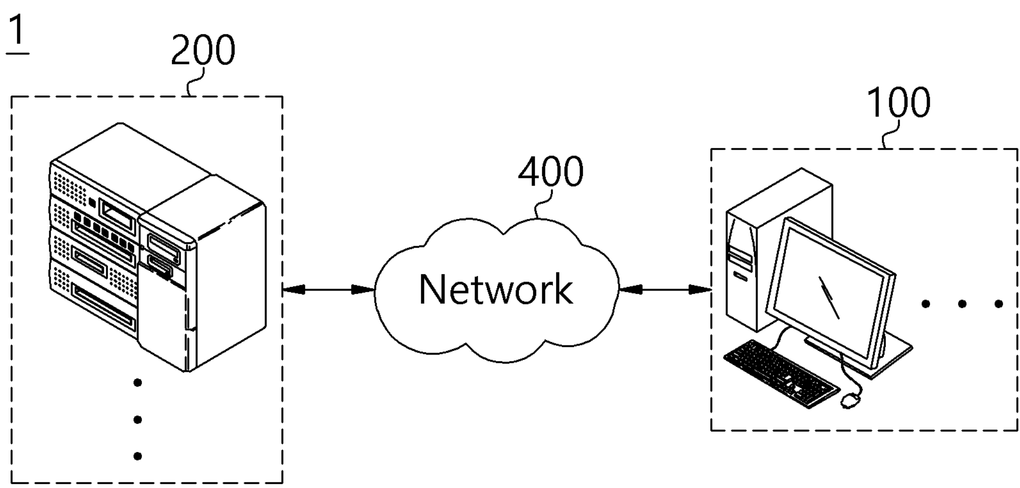
FIG. 2 is an exemplary view of a network environment in which the apparatus for estimating nanoparticles in a solution according to an embodiment of the present invention is connected.

FIG. 2 is an exemplary view of a network environment in which the apparatus for estimating nanoparticles in a solution according to an embodiment of the present invention is connected. Hereinafter, the name of an apparatus 100 for estimating nanoparticles in a solution may be used interchangeably with an estimation apparatus 100.

Referring to FIG. 2, the apparatus 100 for estimating nanoparticles in a solution according to an embodiment of the present invention may include a PC, a server, a terminal, etc., and a network environment 1 including learning devices 200 and a network 400 which connects them in communicate with each other so that they can communicate with each other is depicted.

The apparatus 100 for estimating nanoparticles in a solution according to an embodiment of the present invention may be expressed as an apparatus such as a terminal, a server, and a PC depending on the form implementing the same. However, it is not limited to the scope depicted in FIG. 2.

The apparatus 100 for estimating nanoparticles in a solution may use the learning device 200 during estimating the sizes or types of the nanoparticles in a solution. That is, the apparatus 100 for estimating nanoparticles in a solution may use an artificial intelligence model, for example, a deep neural network, which is trained by the learning device 200, and then stored in the learning device 200. In addition, the apparatus 100 for estimating nanoparticles in a solution may estimate the sizes or types of unknown nanoparticles in a solution using the artificial intelligence model trained by the learning device 200 stored in the apparatus 100 for estimating nanoparticles in a solution through download. Details of the artificial intelligence will be described below.

The learning device 200 may train and evaluate the artificial intelligence model used to estimate the sizes or types of nanoparticles in a solution according to an embodiment of the present invention through learning. The artificial intelligence model that has been evaluated and completed may be used by the apparatus 100 for estimating nanoparticles in a solution with being stored in the learning device 200 or the apparatus 100 for estimating nanoparticles in a solution. Details of the learning device 200 will be described below.

The network 400 may be any suitable communication network including wired and wireless networks such as a local area network (LAN), wide area network (WAN), the Internet, intranet and extranet, and mobile networks such as cellular, 3G, LTE, 5G, or Wi-Fi network, Ad-Hoc network, and a combination thereof.

Figure 3:
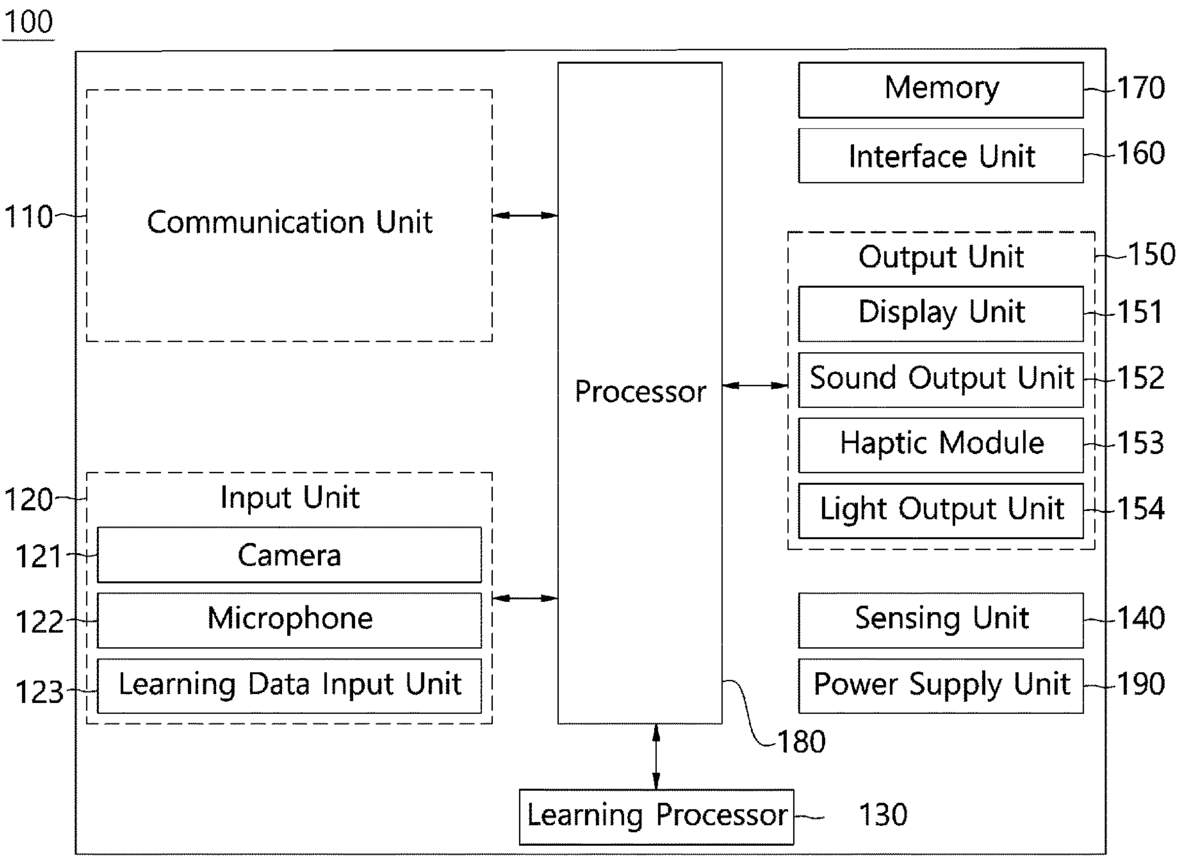
FIG. 3 is a block diagram of the apparatus for estimating nanoparticles in a solution according to an embodiment of the present invention.

FIG. 3 is a block diagram of the apparatus for estimating nanoparticles in a solution according to an embodiment of the present invention.

Referring to FIG. 3, the estimation apparatus 100 may include a communication unit 110, an input unit 120, a learning processor 130, a sensing unit 140, an output unit 150, an interface unit 160, a memory 170, a processor 180 and a power supply unit 190.

The estimation apparatus 100 may be equipped with a learning model.

Meanwhile, the learning model may be implemented as hardware, software, or a combination of hardware and software. When a part or all of the learning model is implemented as software, one or more instructions constituting the learning model may be stored in the memory 170.

The communication unit 110 may include at least one of a broadcast reception module, a mobile communication module, a wireless Internet module, a near field communication module, and a location information module.

The input unit 120 may include a camera 121 for inputting video signals, a microphone 122 for receiving audio signals, and a learning data input unit 123 for receiving signals related to light, shock wave and sound generated by the laser-induced plasma.

The microphone 122 processes external acoustic signals into electrical voice data. The processed voice data may be utilized in various ways depending on functions (or running application programs) being performed by the estimation apparatus 100. Meanwhile, various noise removal algorithms to remove noise generated during receiving the external acoustic signals may be implemented in the microphone 122.

The learning data input unit 123 may acquire training data for training the artificial intelligence model, and input data to be used when acquiring an output using the trained learning model.

In one embodiment, the learning data input unit 123 is configured to collect training data. When signal information is input through the learning data input unit 123, the processor 180 may control an operation of the estimation apparatus 100 to correspond to the input information. The signal information may be signals related to light, shock wave and sound generated by the laser-induced plasma.

The learning processor 130 trains a model composed of an artificial neural network using the training data. Specifically, the learning processor 130 may determine optimized model parameters of the artificial neural network by repeatedly training the artificial neural network using various learning technologies. In this specification, an artificial neural network whose parameters are determined by training using the training data may be referred to as a machine learning model or a trained learning model. In this case, the learning model may be used to infer result values for new input data rather than the training data.

The learning processor 130 may be configured to receive, classify, store and output information to be used for data mining, data analysis, intelligent decision making, and machine learning algorithm and technology.

The learning processor 130 may include one or more memory units configured to store data which are received, detected, sensed, generated, predefined, or output by other components, devices, estimation apparatuses, or apparatuses which communicate with the estimation apparatus.

The learning processor 130 may include a memory integrated or implemented in the estimation apparatus. In some embodiments, the learning processor 130 may be implemented using the memory 170.

Alternatively or additionally, the learning processor 130 may be implemented using a memory associated with the estimation apparatus, such as an external memory coupled directly to the estimation apparatus or memory maintained on a server which communicates with the estimation apparatus.

In another embodiment, the learning processor 130 may be implemented using a memory maintained in a cloud computing environment, or other remote memory location accessible by the estimation apparatus through a communication manner such as a network.

In general, the learning processor 130 may be configured to store data in one or more databases to identify, index, categorize, manipulate, store, search, and output data for use in supervised or unsupervised learning, data mining, predictive analytics, or other machines. Here, the database may be implemented using the memory 170, a memory 230 of the learning device 200, a memory maintained in a cloud computing environment, or other remote memory location accessible by the estimation apparatus through a communication manner such as a network.

Information stored in the learning processor 130 may be used by the processor 180 or one or more other controllers of the estimation apparatus using any of a variety of different types of data analysis algorithms and machine learning algorithms.

The processor 180 may determine or predict at least one executable operation of the estimation apparatus 100 based on the information determined or generated using the data analysis and machine learning algorithms. To this end, the processor 180 may request, search, receive, or utilize data of the learning processor 130, and may control the estimation apparatus to execute a predicted operation or an operation determined to be desirable among the at least one executable operation.

The processor 180 may perform various functions for implementing intelligent emulation (i.e., knowledge-based systems, inference systems, and knowledge acquisition systems), which may be applied to various types of systems (e.g., fuzzy logic systems), including adaptive systems, machine learning systems, artificial neural networks and the like.

The processor 180 may be configured to collect, sense, extract, detect or receive signals or data used in data analysis and machine learning tasks through one or more sensing components in the estimation apparatus, in order to collect information for processing and storage in the learning processor 130.

Collecting information may include sensing information through a sensor, extracting information stored in the memory 170, or receiving information from other apparatuses, entities or external storage devices through a communication means.

The processor 180 may collect usage history information from the estimation apparatus and store it in the memory 170. The processor 180 may determine the best match for executing a particular function using the stored usage history information and predictive modeling.

The processor 180 may receive or sense surrounding environment information or other information through the sensing unit 140. The processor 180 may receive radio signals and radio data through the communication unit 110. The processor 180 may receive image information (or corresponding signals), audio information (or corresponding signals), and piezoelectric (PZT) signals from the input unit 120 and the sensing unit 140.

The processor 180 may collect information in real time, process or classify information (e.g., knowledge graph, command policy, personalization database, conversation engine, etc.), and store the processed information in the memory 170 or the learning processor 130.

When the operation of the estimation apparatus 100 is determined based on the data analysis and machine learning algorithms and technologies, the processor 180 may control components of the estimation apparatus to execute the determined operation. In addition, the processor 180 may control the estimation apparatus according to control commands to perform the determined operation.

When a specific operation is performed, the processor 180 may analyze history information indicating the execution of the specific operation through the data analysis and machine learning algorithms and technologies, and perform update of pre-trained information based on the analyzed information.

Accordingly, the processor 180 may improve the accuracy of future performance of the data analysis and machine learning algorithms and technologies based on the updated information, together with the learning processor 130.

The memory 170 stores data supporting various functions of the estimation apparatus 100. The memory 170 may store a plurality of application programs or applications running on the estimation apparatus 100, data and instructions for the operation of the estimation apparatus 100, and data for the operation of the learning processor 130 (e.g., at least one algorithm information for machine learning, etc.). The memory 170 may store the learning model trained in the learning processor 130 or the learning device 200. In this case, the memory 170 may store the trained learning model by dividing it into a plurality of versions depending on the learning time or learning progress as necessary. In this case, the memory 170 may store input data acquired from the input unit 120, training data used for model training, and the model's learning history. In this case, the input data stored in the memory 170 may be not only data processed suitable for model training, but also raw (unprocessed) input data itself. In addition to the operations related to the application program, the processor 180 typically controls the overall operation of the estimation apparatus 100. The processor 180 may process signals, data, information, and the like input or output through the components discussed above, or run the application program stored in the memory 170, thereby providing or processing appropriate information or functions to a user. Further, the processor 180 may control at least some of the components described with reference to FIG. 3 to run the application program stored in the memory 170. Furthermore, the processor 180 may operate at least two or more of the components included in the estimation apparatus 100 in combination with each other, in order to run the application program. Meanwhile, as described above, the processor 180 controls the operation related to the application programs and typically controls the overall operation of the estimation apparatus 100. For example, if the state of the estimation apparatus satisfies a set condition, the processor 180 may execute or release a lock state to limit the user's input of control commands to the applications.

The power supply unit 190 receives external power or internal power under the control of the processor 180 and supplies the power to the respective components included in the estimation apparatus 100. This power supply unit 190 includes a battery, and the battery may be a built-in battery or a replaceable battery.

The output unit 150 may include a display unit 151 on which an image is displayed, a sound output unit 152 such as a speaker, a haptic module 153 for providing tactile effect, and a light output unit 154 for outputting a light beam.

Machine learning is a field of artificial intelligence, and a research field that gives a computer the ability to learn without explicit programming. Specifically, the machine learning may be referred to a technology that studies and builds a system capable of performing learning and prediction, and improving its own performance based on empirical data and algorithms for the same. The algorithms of machine learning build a specific model to deduce predictions or decisions based on input data, rather than executing strictly fixed static program instructions.

In one embodiment of the present invention, a machine learning model may be used, and the machine learning model may be trained using training data and used as a trained learning model.

In addition, the present invention may employ supervised learning, which trains a machine learning model in a state where a label for training data is given. Here, the label refers to the correct answer (or result value) that the machine learning model should infer when the training data is input to the machine learning model.

The training data represents a plurality of features, and labeling the training data may mean that the features represented by the training data are labeled. In this case, the training data may represent the features of the input object in the form of a vector.

Using training data and labeling data, the machine learning model may infer a function for the correlation between the training data and the labeling data. Further, parameters of the machine learning model may be determined (optimized) through evaluation of the function inferred by the machine learning model. In one embodiment of the present invention, previously known size or type information of standard nanoparticles may be the label, the intensities of the laser incident on the cell for each laser pulse, the intensities of the lasers passing through the cell for each laser pulse, and the feedback signals generated by the laser-induced plasma for each laser pulse may be the training data.

Specifically, the training data may include an image included in the feedback signal, a frequency and an intensity of the PZT signal, a frequency and an intensity of the MIC (microphone) signal, intensities of the laser incident on the cell for each laser pulse, and intensities of the lasers passing through the cell for each laser pulse.

The training data and labels corresponding to the training data constitute one training data set, and may be input to the machine learning model in the form of training data.

In addition, the apparatus 100 for estimating nanoparticles in a solution may retrain the artificial intelligence model trained by the learning device 200 using training data acquired from another environment based on a transfer learning method. In addition, the apparatus 100 for estimating nanoparticles in a solution may use various artificial intelligence application programs provided by the learning device 200 in a process of executing the artificial intelligence model and a process of performing relearning.

In one embodiment of the present invention, a method for estimating nanoparticles in a solution using the machine learning model may use, for example, a method for training a machine learning model from the basics as a method for estimating nanoparticles in a solution based on deep learning.

Basic training of the machine learning model, that is, deep network training, requires the processes of collecting labeled training data sets, designing a network architecture to train features thereof, and completing the model. Results may be obtained through the deep network training.

In one embodiment, the machine learning-based learning model may include at least one machine learning model of deep neural network (DNN), scalable vector extension (SVE), XGBoost algorithm, light gradient boosting model (Light GBM), support vector machine (SVM), Gaussian process model (GPM), random forest (RF), convolutional neural network (CNN), region based CNN (R-CNN), convolutional recursive neural network (C-RNN), Fast R-CNN, Faster R-CNN, region based fully convolutional network (R-FCN), you only look once (YOLO) and single shot multibox detector (SSD) structures.

Figure 4:
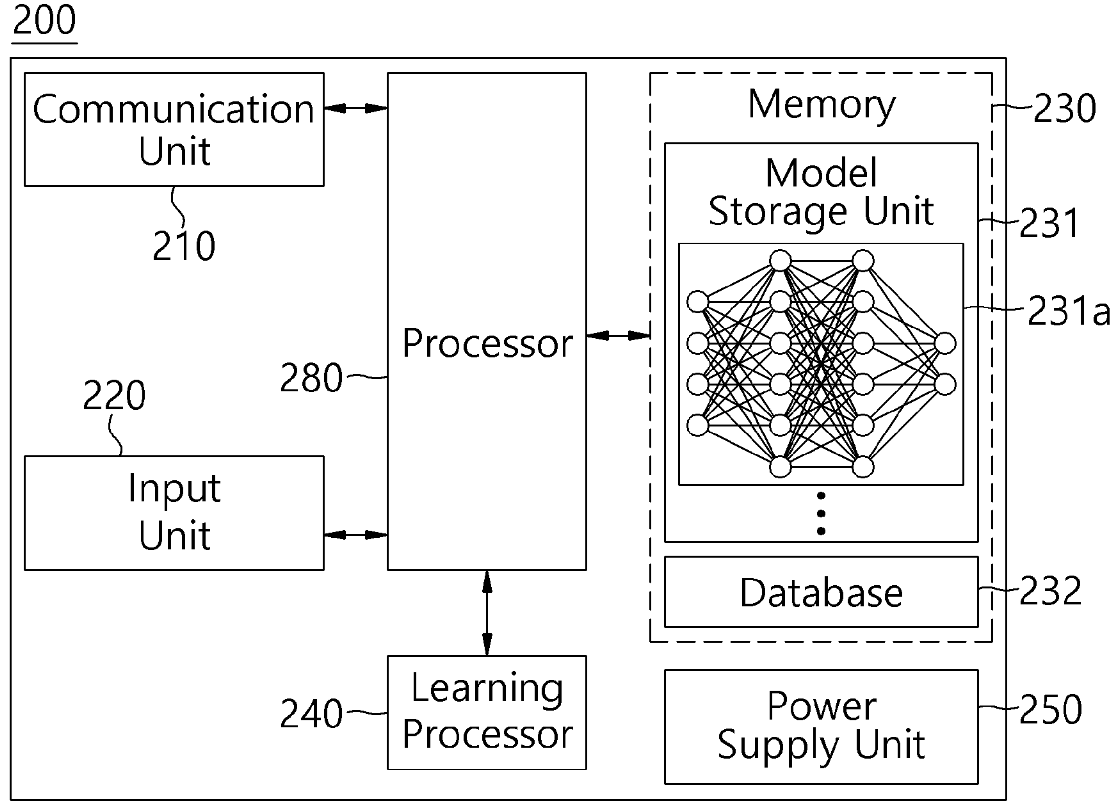
FIG. 4 is a block diagram of a learning device of an artificial intelligence model according to an embodiment of the present invention.

FIG. 4 is a block diagram of a learning device of an artificial intelligence model according to an embodiment of the present invention.

The learning device 200 is a device or server separately configured outside the estimation apparatus 100, and may perform the same function as the learning processor of the estimation apparatus 100.

That is, the learning device 200 may be configured to receive, classify, store and output information to be used for data mining, data analysis, intelligent decision making, and machine learning algorithms. Here, the machine learning algorithm may include the deep learning algorithm.

The learning device 200 may communicate with at least one estimating apparatus 100, and may analyze data or perform training on behalf of or by helping the estimating apparatus 100 to deduce results. Here, helping other devices may mean distributing computing power through distributed processing.

The learning device 200 of the machine learning model is a variety of devices for training the machine learning model, and may typically mean server, and may be referred to as a learning device or a learning server.

In particular, the learning device 200 may be implemented not only as a single server, but also as a plurality of server sets, cloud servers, or a combination thereof.

In other words, a plurality of learning devices 200 may be provided to form a learning device set (or cloud server), and at least one or more learning devices 200 included in the learning device set may analyze data or perform training through distributed processing to deduce results.

The learning device 200 may transmit a model trained through machine learning or deep learning to the estimation apparatus 100 periodically or upon request.

Referring to FIG. 4, the learning device 200 may include a communication unit 210, an input unit 220, a memory 230, a learning processor 240, a power supply unit 250, a processor 280 and the like.

The communication unit 210 may transmit and receive data with other devices through wired or wireless communication or an interface.

The input unit 220 may acquire data by receiving data through the communication unit 210. The input unit 220 may acquire training data for model training and input data for acquiring an output using the trained learning model.

The input unit 220 may acquire raw input data, and in this case, the processor 280 may preprocess the acquired data to generate training data or preprocessed input data that can be input to model training.

The memory 230 may include a model storage unit 231 and a database 232.

The model storage unit 231 stores a model being trained or the trained learning model (or machine learning model 231*a*) through the learning processor 240, and when the model is updated through training, stores the updated model.

In this case, the model storage unit 231 may store the trained learning model by dividing it into a plurality of versions depending on the learning time or learning progress as necessary.

The machine learning model 231*a* shown in FIG. 4 is only an example of an artificial intelligence model including a plurality of hidden layers, and the artificial intelligence model of the present invention is not limited thereto.

The machine learning model 231*a* may be implemented in hardware, software, or a combination of hardware and software. When a part or all of the machine learning model 231*a* is implemented as software, one or more instructions constituting the machine learning model 231*a* may be stored in the memory 230.

The database 232 stores input data acquired from the input unit 220, training data used for model learning, and the model's learning history.

The input data stored in the database 232 may be not only data processed to be suitable for model learning, but also raw input data itself.

The learning processor 240 may train (or learn) the machine learning model 231*a* using training data. The learning processor 240 may train the machine learning model 231*a* by directly acquiring data obtained through the input unit 220 as input data and preprocessed by the processor 280, or train the machine learning model 231*a* by acquiring preprocessed input data stored in the database 232.

The learning processor 240 may determine optimized model parameters of the machine learning model 231*a* by repeatedly training the machine learning model 231*a* using various learning technologies. To this end, the learning processor 240 may first collect training data and labeling data for training the machine learning model.

The training data may include intensities of each laser incident on a cell containing a solution including standard nanoparticles with previously known size or type information for each laser pulse, intensities of each laser passing through the cell, and the feedback signals generated by the laser-induced plasma for each laser pulse. The labeling data may be size or type information of the standard nanoparticles corresponding to the training data.

The standard nanoparticles may be, for example, fine particles with a size of several to hundreds of nanometers contained in a chemical for a semiconductor. The standard nanoparticles may be classified into multiple types depending on the sizes and types thereof.

Specifically, in order to collect training data, the learning processor 240 may induce the generation of laser-induced plasma by making a pulsed laser beam incident on a cell containing a solution including standard nanoparticles with previously known size or type information, and acquire feedback signals emitted as light, shock wave and sound generated by the laser-induced plasma. In this case, the corresponding feedback signals may be acquired for each laser pulse while changing the laser pulse differently.

In order to acquire a feedback signal emitted as the light, the learning processor 240 may acquire an image by photographing a light emitted from the laser-induced plasma through a camera, and acquire information on a location coordinate of the light emitted corresponding to the emission direction of the light, the intensity of the light and the size of the light from the image.

In order to acquire a feedback signal emitted as the shock wave, the learning processor 240 may acquire a shock wave generated by the laser-induced plasma as a PZT signal through a PZT sensor, and acquire the frequency and intensity of the shock wave signal emitted by the laser-induced plasma from the PZT signal.

In order to acquire a feedback signal emitted as the sound, the learning processor 240 may acquire a sound generated by the laser-induced plasma as an MIC signal, and acquire the frequency and intensity of the sound signal emitted by the laser-induced plasma from the MIC signal.

In addition, the learning processor 240 may measure the intensity of the laser before the pulse laser beam is made incident on the cell, and measure the intensity of the laser after the pulse laser beam has passed the cell. In this case, the intensity of the laser may be measured using a dedicated measuring device or a known measuring method.

In addition, the learning processor 240 may acquire the laser pulse through setting information regarding the laser pulse of a laser beam emitting device or through input information of a user, but it is not limited to these methods.

The learning processor 240 may acquire feedback signals for each laser pulse from every standard nanoparticles, and acquire the intensities of each laser incident on the cell for each laser pulse and the intensities of each laser passing through the cell to build a database, thereby storing the database in the memory 230.

Thereby, the sizes or types of the standard nanoparticles may be acquired as labeling data, and the intensities of each laser incident on a cell containing a solution including standard nanoparticles with previously known size or type information for each laser pulse, the intensities of each laser passing through the cell, and the feedback signals generated by the laser-induced plasma for each laser pulse may be acquired as training data.

Next, the learning processor 240 may train a model for estimating nanoparticles in a solution by machine learning based on the training data. That is, when the intensities of the laser incident on the cell for each laser pulse, the intensities of the lasers passing through the cell for each laser pulse, and the feedback signal generated by the laser-induced plasma for each laser pulse are input into the machine learning model as the training data, the learning processor 240 may train the machine learning model to infer the sizes or types of nanoparticles, which are labeling data.

In this case, the learning model may infer the result values with being mounted on the learning device 200 of the machine learning model, or may be transmitted to and mounted on another device such as the estimation apparatus 100 through the communication unit 210.

In addition, when the learning model is updated, the updated learning model may be transmitted to and mounted on another device such as the estimation apparatus 100, through the communication unit 210.

Hereinafter, a method for estimating nanoparticles in a solution by the processor 280 based on the pre-trained machine learning model by the learning processor 240 will be described.

The processor 280 may induce the generation of the laser-induced plasma by making a pulsed laser beam incident on a cell containing a solution including unknown nanoparticles intended to infer the size or type information thereof by controlling the laser emitting device.

That is, the laser-induced plasma may be generated by making a pulsed laser beam incident on a cell in a uniaxial direction so as to focus on an inside of the cell containing a solution including unknown nanoparticles. In this case, by emitting a laser beam for each laser pulse, the processor 280 may acquire the intensity of the laser incident on the cell corresponding to each laser pulse, the intensity of the laser passing through the cell, and the feedback signal generated by the laser-induced plasma for each laser pulse.

To generate a laser-induced plasma, the Nd: YAG pulsed laser may be used, and the laser beam may be collected inside a flow cell through a condenser lens. In this case, since the laser beam includes numerous photons, it stimulates the atoms, causing them to transition to an excited state and then return to the ground state, thereby emitting light, shock wave and sound.

Accordingly, the processor 280 may acquire feedback signals based on the light, shock wave and sound emitted by the laser-induced plasma.

That is, an image may be acquired by photographing a light emitted from the laser-induced plasma using a camera, and information on a location coordinate of the light emitted corresponding to the emission direction of the light, the intensity of the light and the size of the light may be acquired from the image.

In addition, the processor 280 may acquire the shock wave generated by the laser-induced plasma as a PZT signal through a PZT sensor, and acquire the frequency and intensity of the shock wave signal emitted by the laser-induced plasma from the PZT signal.

In addition, the processor 280 may acquire the sound generated by the laser-induced plasma as an MIC signal, and acquire the frequency and intensity of the sound signal emitted by the laser-induced plasma from the MIC signal.

Meanwhile, in one embodiment of the present invention, the intensity of the laser required to excite a substance using a laser beam is generally greater in an order of solid, liquid and gas. Therefore, theoretically, it may aim to excite only the nanoparticles by making a laser beam corresponding to a predetermined intensity lower than the intensity of the laser beam for exciting a liquid incident on the cell containing a liquid including nanoparticles. However, in reality, there may a case where the liquid is excited together with the solid. Therefore, the feedback signals generated by the excitation of the liquid may be detected and filtered as noise signals in the learning step to analyze the sizes or types of the originally intended solid particles.

As an example, signals identical to the noise feedback signals may be detected and removed from the feedback signals. Here, similar to the feedback signals, the noise feedback signals may be acquired from the image, shock wave signal and sound signal.

Accordingly, the processor 280 may input the laser pulse, the intensity of the laser incident on the cell corresponding to each laser pulse, the intensity of the laser passing through the cell, and the feedback signal generated by the laser-induced plasma to the pre-trained machine learning model, thereby acquiring a value for estimating the sizes or types of unknown nanoparticles based on the information output through the machine learning model.

The power supply unit 250 supplies a power to the learning device 200.

In addition, the learning device 200 may evaluate the machine learning model 231*a*, and even after evaluation, update the machine learning model 231*a* for better performance, and provide the updated machine learning model 231*a* to the estimation apparatus 100 again.

Figure 5:
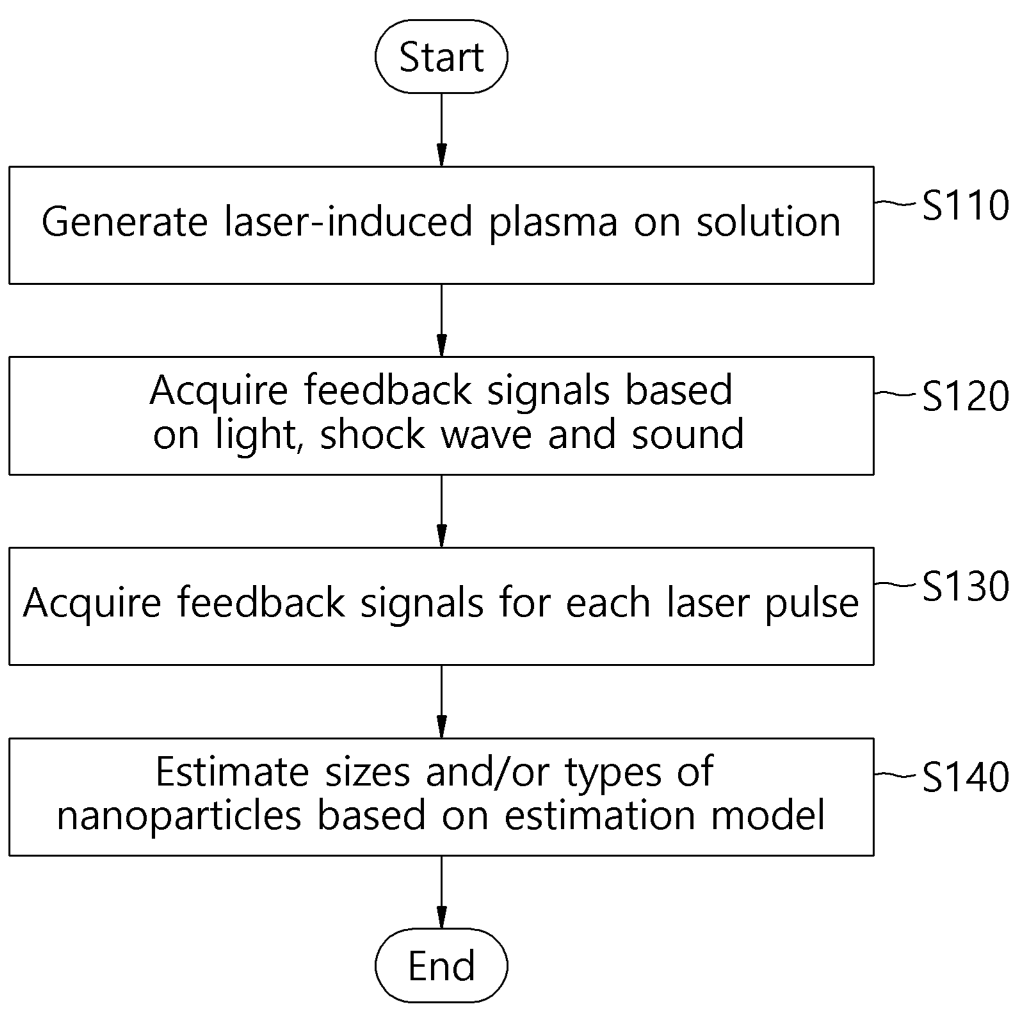
FIG. 5 is a flowchart illustrating procedures of a method for estimating nanoparticles in a solution according to an embodiment of the present invention.

FIG. 5 is a flowchart illustrating procedures of a method for estimating nanoparticles in a solution according to an embodiment of the present invention.

Referring to FIG. 5, the method for estimating sizes or types of nanoparticles in a solution according to an embodiment of the present invention includes, first, a step of generating a laser-induced plasma by making a pulsed laser beam incident on a cell containing a solution (S110).

That is, the laser-induced plasma may be generated by making a pulsed laser beam incident on a cell in a uniaxial direction so as to focus on an inside of the cell containing a solution including unknown nanoparticles in which presence or absence thereof and the sizes or types of nanoparticles cannot be known.

To generate a laser-induced plasma, the Nd: YAG pulsed laser may be used, and the laser beam may be collected inside a flow cell through a condenser lens. In this case, since the laser beam includes numerous photons, it stimulates the atoms, causing them to transition to an excited state and then return to the ground state, thereby emitting light, shock wave and sound.

Next, a feedback signal may be acquired based on the light, shock wave and sound generated by the laser-induced plasma (S120).

That is, an image may be acquired by photographing a light emitted from the laser-induced plasma using a camera, and information on a location coordinate of the light emitted corresponding to the emission direction of the light, the intensity of the light and the size of the light may be acquired from the image.

In addition, the shock wave generated by the laser-induced plasma may be acquired as a PZT signal through a PZT sensor, and the frequency and intensity of the shock wave signal emitted by the laser-induced plasma may be acquired from the PZT signal.

In addition, the sound generated by the laser-induced plasma may be acquired as an MIC signal, and the frequency and intensity of the sound signal emitted by the laser-induced plasma may be acquired from the MIC signal.

Then, feedback signals may be acquired for each laser pulse (S130).

That is, by making a laser beam incident on the cell while controlling laser pulses differently, feedback signals corresponding to each laser pulse may be acquired.

Next, the sizes or types of nanoparticles included in the solution may be estimated by inputting the feedback signals into a pre-trained nanoparticle estimation model (S140).

Meanwhile, the inventive method may further include a step of training a nanoparticle estimation model (machine learning model) before using the nanoparticle estimation model, which may be executed in any order as long as it is performed before the step of estimating nanoparticles included in the solution (S140).

Hereinafter, a method for training a model for estimating nanoparticles in a solution according to an embodiment of the present invention will be described with reference to FIG. 6.

Figure 6:
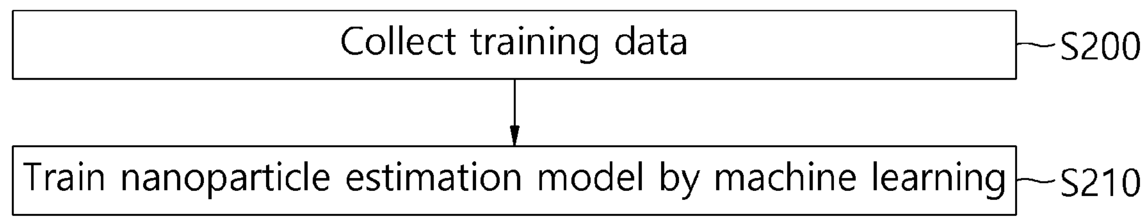
FIG. 6 is a flowchart illustrating procedures of a method for training a model for estimating nanoparticles in a solution according to an embodiment of the present invention.

Referring to FIG. 6, first, the learning device may collect training data (S200).

The training data may include intensities of each laser incident on a cell containing a solution including standard nanoparticles with previously known size or type information for each laser pulse, intensities of each laser passing through the cell, and the feedback signals generated by the laser-induced plasma for each laser pulse.

Labeling data, which are the sizes of the nanoparticles or the types of nanoparticles that the learning model should infer, may be labeled in the training data corresponding to such the training data.

The standard nanoparticles may be, for example, fine particles with a size of several to hundreds of nanometers contained in a chemical for a semiconductor. The standard nanoparticles may be classified into multiple types depending on the sizes and types thereof.

Specifically, in order to collect training data, the generation of laser-induced plasma may be induced by making a pulsed laser beam incident on a cell containing a solution including the standard nanoparticles with previously known size or type information, and feedback signals emitted as light, shock wave and sound generated by the laser-induced plasma may be acquired. In this case, the corresponding feedback signals may be acquired for each laser pulse while changing the laser pulse differently.

To produce a laser-induced plasma, the Nd: YAG pulsed laser may be used, and the laser beam may be collected inside a flow cell through a condenser lens. In this case, since the laser beam includes numerous photons, it stimulates the atoms, causing them to transition to an excited state and then return to the ground state, thereby emitting light, shock wave and sound.

In order to acquire a feedback signal emitted as the light, an image may be acquired by photographing a light emitted from the laser-induced plasma through a camera, and information on a location coordinate of the light emitted corresponding to the emission direction of the light, the intensity of the light and the size of the light may be acquired from the image.

In order to acquire a feedback signal emitted as the shock wave, a shock wave generated by the laser-induced plasma may be acquired as a PZT signal through a PZT sensor, and the frequency and intensity of the shock wave signal emitted by the laser-induced plasma may be acquired from the PZT signal.

In order to acquire a feedback signal emitted as the sound, a sound generated by the laser-induced plasma may be acquired as an MIC signal, and the frequency and intensity of the sound signal emitted by the laser-induced plasma may be acquired from the MIC signal.

In addition, the intensity of the laser before the pulse laser beam is made incident on the cell may be measured, and the intensity of the laser after the pulse laser beam has passed through the cell may be measured. In this case, the intensity of the laser may be measured using a dedicated measuring device or a known measuring method.

In addition, the laser pulse may be acquired through setting information regarding the laser pulse of a laser beam emitting device or through input information of a user, but it is not limited to these methods.

In addition, feedback signals may be acquired for each laser pulse from every standard nanoparticles, and the intensities of each laser incident on the cell for each laser pulse and the intensities of each laser passing through the cell may be acquired to build a database, thereby storing the database in memory.

Thereby, the sizes or types of the standard nanoparticles may be acquired as labeling data, and intensities of each laser incident on a cell containing a solution including standard nanoparticles with previously known size or type information for each laser pulse, intensities of each laser passing through the cell, and the feedback signals generated by the laser-induced plasma for each laser pulse may be acquired as training data.

Next, a model for estimating nanoparticles in a solution may be trained by machine learning based on the training data (S210).

That is, when the intensities of the laser incident on the cell for each laser pulse, the intensities of the lasers passing through the cell for each laser pulse, and the feedback signal generated by the laser-induced plasma for each laser pulse are input into the machine learning model as the training data, the learning processor 240 may train the machine learning model to infer the sizes or types of nanoparticles, which are labeling data.

Meanwhile, generally, the intensity of the laser required to excite a substance using a laser beam is generally greater in an order of solid, liquid and gas. Therefore, theoretically, it may aim to excite only the nanoparticles by making a laser beam corresponding to a predetermined intensity lower than the intensity of the laser beam for exciting a liquid incident on the cell containing a liquid including nanoparticles. However, in reality, there may a case where the liquid is excited together with the solid. Therefore, the feedback signals generated by the excitation of the liquid may be filtered as noise signals in the learning step. That is, the inventive method may include a step of removing the noise signals through the trained machine learning model, or detecting and filtering noise feedback signals among the feedback signals.

To this end, a pulsed laser beam is made incident on a cell containing only a solution in advance to generate a laser-induced plasma, and noise feedback signals are acquired based on the light, shock wave and sound generated by the laser-induced plasma, thereby storing the noise feedback signals corresponding to the solution as noise feedback signals for each laser pulse, and detecting and removing them from the feedback signals. Likewise, the noise feedback signals may also be acquired as an image, the frequency and intensity of the shock wave signal, and the frequency and intensity of the sound signal according to the light, shock wave and sound generated by the laser-induced plasma.

Meanwhile, combinations of each block in the accompanying block diagram and each step in the flowchart may be performed by computer program instructions. These computer program instructions may be installed in the encoding processor of a general purpose computer, special purpose computer, or other programmable data processing equipment, such that the instructions, executed by the processor of the computer or other programmable data processing equipment, will create means for performing the functions described in each block of the block diagram or each step in the flowchart. These computer program instructions may also be stored in a computer-usable or computer-readable memory which can direct the computer or other programmable data processing equipment, to implement a function in a particular manner, such that the instructions stored in the computer-usable or computer-readable memory may produce an article of manufacture including instruction means which perform the functions described in each block of the block diagram or each step of the flowchart. Further, the computer program instructions may be installed in a computer or other programmable data processing equipment, such that a series of operating steps are performed on the computer or other programmable data processing equipment to create a process executed by the computer, and thereby the instructions which execute the computer or other programmable data processing equipment may also provide steps for performing the functions described in each block of the block diagram or each step of the flowchart.

In addition, each block or each step may represent modules, segments, or parts of codes including one or more executable instructions for performing specific logical function(s). Moreover, it should be noted that the functions mentioned in the blocks or steps may be performed in different order in several alternative embodiments. For example, two successive blocks or steps may in fact be performed substantially at the same time, or the blocks or steps may sometimes be performed in reverse order according to functions thereof.

The above description is merely illustrative of the technical idea of the present invention, and those skilled art to which the present invention pertains will appreciate that various modifications and variations are possible without departing from the essential characteristics of the present invention. Therefore, the embodiments disclosed in the present invention are intended to describe the technical idea of the present invention, and are not intended to limit the same, as well as the scope of the technical idea of the present invention is not limited to these embodiments. It should be understood that the protective scope of the present invention is interpreted by the claims below, and all technical ideas within the equivalent range are included in the scope of the present invention.

What is claimed is:

1. A method for estimating nanoparticles in a solution, the method comprising:

generating a laser-induced plasma by making a pulsed laser beam incident on inside a cell containing a solution;

acquiring feedback signals based on light, shock wave and sound generated by the laser-induced plasma;

acquiring the feedback signals, an intensity of the laser incident on the cell, and intensities of each laser passing through the cell for each laser pulse; and inputting the feedback signals acquired for each laser pulse, the intensity of the laser, and the intensities of the lasers passing through the cell into a pre-trained nanoparticle estimation model to estimate sizes or types of unknown nanoparticles included in the solution-, the method further comprising a learning step of training the nanoparticle estimation model before the step of estimating a size of nanoparticles, wherein the learning step comprises:

collecting training data; and training the nanoparticle estimation model by machine learning based on the training data, wherein the training data comprises intensities of each laser incident on a cell containing a solution including standard nanoparticles with previously known size or type information for each laser pulse, intensities of each laser passing through the cell, and the feedback signals generated by the laser-induced plasma, wherein the step of collecting training data comprises:

generating a laser-induced plasma by making the pulsed laser beam incident on a cell containing only the solution;

acquiring noise feedback signals based on light, shock wave and sound generated by the laser-induced plasma; and filtering signals identical to the noise feedback signals from the feedback signals acquired in the step of acquiring for each laser pulse.

2. The method according to claim 1, wherein the acquiring of the feedback signals comprises:

acquiring an image by photographing light emitted from the laser-induced plasma using a camera;

acquiring a shock wave generated by the laser-induced plasma as a PZT signal; and acquiring a sound generated by the laser-induced plasma as a microphone (MIC) signal.

3. The method according to claim 2, wherein the acquiring of the feedback signals further comprises:

acquiring a location coordinate of the light, an intensity of the light, and a size of the light emitted by the laser-induced plasma from the image;

acquiring a frequency and an intensity of the shock wave signal emitted by the laser-induced plasma from the PZT signal; and acquiring a frequency and an intensity of the sound signal emitted by the laser-induced plasma from the MIC signal.

4. The method according to claim 1, wherein the pulsed laser beam is emitted through an Nd: YAG pulsed laser.

5. The method according to claim 1, wherein the standard nanoparticles included in the solution are fine particles with a size of several to hundreds of nanometers contained in a chemical for a semiconductor.

6. An apparatus for estimating nanoparticles in a solution, the apparatus comprising:

a memory configured to store information on a nanoparticle estimation model including a pre-trained machine learning model;

a communication unit configured to transmit and receive information with an external device; and a processor configured to control the memory and the communication unit, the processor further configured to:

generate a laser-induced plasma by making a pulsed laser beam incident on inside a cell containing a solution;

acquire feedback signals based on light, shock wave and sound generated by the laser-induced plasma;

acquire the feedback signals, an intensity of the laser incident on the cell, and intensities of each laser passing through the cell for each laser pulse; and input the feedback signals acquired for each laser pulse, the intensity of the laser, and the intensities of the lasers passing through the cell into a pre-trained nanoparticle estimation model to estimate sizes or types of unknown nanoparticles included in the solution, wherein the processor further performs a learning operation of training the nanoparticle estimation model, wherein the learning step comprises the operations of:

collecting training data; and training the nanoparticle estimation model by machine learning based on the training data, wherein the training data comprises intensities of each laser incident on a cell containing a solution including standard nanoparticles with previously known size or type information for each laser pulse, intensities of each laser passing through the cell, and the feedback signals generated by the laser-induced plasma, wherein in the operation of collecting training data, the processor performs the operations of:

generating a laser-induced plasma by making the pulsed laser beam incident on a cell containing only the solution;

acquiring noise feedback signals based on light, shock wave and sound generated by the laser-induced plasma; and filtering signals identical to the noise feedback signals from the feedback signals acquired in the step of acquiring for each laser pulse.

7. The method according to claim 6, wherein, in acquiring the feedback signals, the processor is further configured to:

acquire an image by photographing light emitted from the laser-induced plasma using a camera;

acquire a shock wave generated by the laser-induced plasma as a PZT signal; and acquire a sound generated by the laser-induced plasma as a MIC (microphone) signal.

8. The apparatus according to claim 7, wherein in acquiring the feedback signals, the processor is further configured to:

acquire a location coordinate of the light, an intensity of the light, and a size of the light emitted by the laser-induced plasma from the image;

acquire a frequency and an intensity of the shock wave signal emitted by the laser-induced plasma from the PZT signal; and acquire a frequency and an intensity of the sound signal emitted by the laser-induced plasma from the MIC signal.

9. The apparatus according to claim 6, wherein the pulsed laser beam is emitted through an Nd: YAG pulsed laser.

10. The apparatus according to claim 6, wherein the standard nanoparticles included in the solution are fine particles with a size of several to hundreds of nanometers contained in a chemical for a semiconductor.

* * * * *